June 1, 1948.  A. M. STARR  2,442,622
SEAL
Filed Nov. 16, 1943

INVENTOR.
Allan M. Starr
BY
ATTORNEY.

Patented June 1, 1948

2,442,622

UNITED STATES PATENT OFFICE 2,442,622

SEAL

Allan M. Starr, Piedmont, Calif., assignor to the United States of America as represented by the United States Atomic Energy Commission Application November 16, 1943, Serial No. 510,508

1 Claim. (Cl. 286—15)

The invention relates to a device, such as a rod, which passes through the wall of a chamber and is manipulable from the exterior thereof. It is desirable that the rod be freely movable in translation, in rotation and in rocking movement but that little or no leakage accompany such motion. The embodiments of the invention are useful under any circumstances wherein different conditions exist on opposite sides of the chamber wall, for example, wherein different gases are separated by the wall. But the chief environment is in connection with vacuum apparatus which is described herein as an illustration, although no difference of pressure or of other conditions on opposite sides of the chamber wall is necessary.

In vacuum apparatus, particularly in laboratory setups or in commercial apparatus, wherein high vacua are necessary and in which manipulations must be performed within the vacuum chamber, it is relatively easy by appropriate mechanism to have a structure extend through the vacuum chamber defining wall and be mounted for rotation upon its own axis and even for translation along its own axis. It is very difficult, however, to provide a means for affording a rocking motion of a manipulating device and at the same time to preserve a sufficient degree of vacuum tightness. It is also difficult to provide a suitable mounting means for affording general or universal motion of a manipulating device, which does not also transmit undue strains to the mounting walls of the vacuum chamber.

It is therefore an object of the invention to provide, for use with super- or sub-atmospheric pressure chamber walls, a seal and mounting permitting substantially universal motion.

Another object of the invention is to provide a universal motion mounting which is at the same time a tight seal.

An additional object of the invention is to provide a seal for universal motion which is readily adaptable to vacuum chamber mounting.

An additional object of the invention is to provide an improved seal for universal motion.

Other objects together with the foregoing will be set forth in the following description of the invention and will appear from the accompanying drawing, in which.

Figure 1:
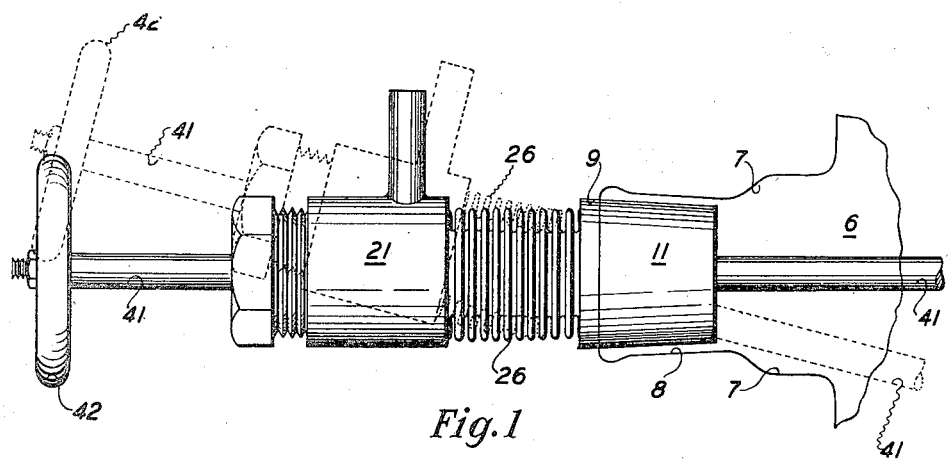
Figure 1 is a side elevation of a seal in accordance with the invention, portions of the vacuum chamber being broken away to reduce the size of the figure.

In its preferred form, the seal of the invention includes a pair of pierced bodies, one of which is mountable in the wall of a vacuum chamber and the other of which is capable of supporting a manipulating rod which passes through both bodies into the vacuum chamber. The bodies have spherical meeting faces to permit relative movement therebetween, and are likewise joined by an air-tight bellows encompassing the spherical surfaces. The mounting body is bored out, preferably in conical shape, to afford manipulation room for the rod, while the supporting body is provided with a suitable packing to seal the manipulating rod in any of its adjusted positions. Suitable vacuum pumping connections are provided to facilitate the exhaust of contained air from the seal.

The seal of the invention is susceptible to embodiment in a large number of variant forms, and is also adaptable for use under many different environmental conditions. It has provided particularly successful in the environment and form illustrated in the accompanying drawings. Such environment includes a vacuum chamber 6, in the present instance illustrated as being defined by glass boundary walls 7 terminating in a conically-bored boss 8. The interior of the vacuum chamber is in communication with any suitable vacuum establishing means, not shown, and is assumed to be equipped with some mechanism, not shown, which requires manipulation while the pressure within the chamber 6 is sub-atmospheric.

In accordance with the invention, the boss 8 receives a mount 9 which preferably is fabricated of metal such as brass or bronze, and is exteriorly contoured to provide a slightly tapered, enlarged portion 11 mating with the interior of the boss 8 and being sealed thereto in any of the well-known ways. In effect, the mount 9 becomes a portion of the wall 7 of the vacuum chamber 6 and not only serves as a general support for the manipulating structure, but also is part of the defining boundary of the vacuum chamber.

Figure 2:
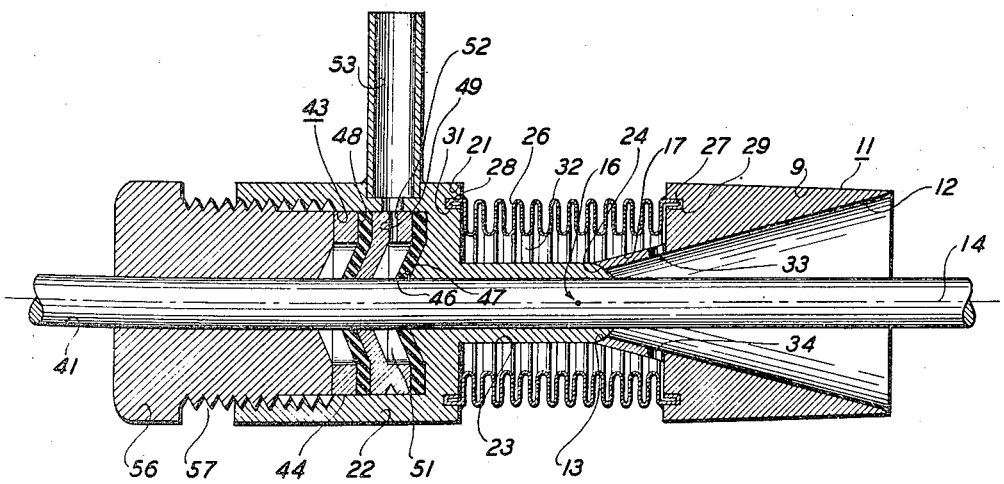
Figure 2 is a cross-section on a longitudinal, vertical plane, of the seal in accordance with the invention.

The interior of the mount 9 is pierced by a conical bore 12, the larger diameter of which is nearer the vacuum chamber 6, while the smaller portion merges with a hollow spherical bearing surface 13, concentric with the longitudinal axis of the mount 9 represented by the broken line 14 in Figure 2. The spherical surface 13 is preferably such that its center 16 is near to but somewhat spaced from the point of convergence of the conical bore 12. The exterior of the mount 9 is reduced in diameter adjacent the spherical surface 13 to afford a generally conical extension 17 of the mount.

Adapted to cooperate with the mount 9 is a sleeve 21. This member preferably is fabricated of brass or bronze, and is comprised of an enlarged portion 22 and a reduced portion 23 constituting an extension. The sleeve 21 in central position is symmetrical about the axis 14 and its reduced portion 23 terminates in a spherical bearing surface 24, the center of which is preferably at the point 16 so that the surface 24 is slidable with respect to the surface 13 when the two are in substantial abutment. Preferably, the surface 24 extends radially inward farther than the surface 13, so that when in the position shown in Figure 2 the surfaces 13 and 24 are not exactly coextensive.

In order to maintain the surfaces 24 and 13 in abutting, sliding contact, and in order to maintain substantially the desired relative position of the mount 9 and the sleeve 21, although permitting universal motion thereof within the designed limits, there is provided an envelope 26, preferably constituted by a corrugated, metallic bellows in central position arranged coaxially with the extension 23 and encompassing the bearing surfaces 24 and 13. The bellows 26 is arranged with its intermediate or central portion close to the center 16 of the spherical surfaces so that the bellows partakes almost entirely of a rocking flexure in the central portion thereof, thereby minimizing lateral distortion of the bellows ends. The envelope or bellows 26 at one end is securely anchored in the mount 9, while at the other end the bellows is securely anchored in the sleeve 21. These anchors are preferably effectuated by cylindrical extensions 27 and 28 at the ends of the bellows, which are received in grooves 29 and 31 in the mount and in the sleeve, respectively. A weld or soldered connection is made between the extensions 27 and 28 and the mount and sleeve, so that the flexible, metallic envelope affords an air-tight connection between the mount and sleeve and defines an interior chamber 32.

In order that the pressure within the chamber 32 can be made different than the exterior pressure, the conical extension 17 is pierced by apertures 33 and 34, respectively, affording communication between the chamber 32 and the interior of the conical bore 12 which is subject to the pressure within the chamber 6. These apertures are effective in reducing the pumping-out time of the chamber 32 and likewise insure that there is no substantial pressure difference on opposite sides of the spherical surfaces 13 and 24. The encompassing metallic bellows or envelope is effective not only as a seal to define a chamber between the mount and the sleeve, but its inherent contractive resiliency is such with respect to its length and mounting as to urge the sleeve into relatively tight abutment with the mount so that the spherical surfaces 13 and 24 are maintained in a firm contact in all their momentary positions of relative orientation. A firm ball support and guide is therefore formed even though no pressure difference exists. But when the interior of the chambers 6 and 32 is evacuated there is a resultant inward force which keeps the relatively movable seats 13 and 24 well mated. Yet, the flexibility of the bellows or envelope 26 is such that the surfaces 24 and 13 are freely rotatable and slidable with respect to each other within the mechanical limits of the apparatus.

In order to perform the desired manipulation within the vacuum chamber 6, there is provided a manipulating rod 41 which is usually an elongated, cylindrical member, in central position coaxial with the axis 14 and having any suitable manipulating handle 42 on the exterior end thereof. The rod 41 is shown broken away in the figures, since the particular manipulating terminus is immaterial to the present invention. The rod 41 is of such a diameter that it is firmly supported within the extension 23 of the sleeve 21, although it is also freely rotatable and axially slidable therein. Furthermore, the handle 42 can, in effect, be bodily rotated about the point 16 as a center, thereby swinging the rod 41 from the central full-line position of Figure 1 into an extreme dotted-line position, as shown in that figure. The rod 41 is therefore manipulable not only by rotation about its own axis, not only by translation along its own axis, but likewise by swinging through an angle. This angle, as illustrated, for example in Figure 1, is limited solely by the divergence of the conical bore 12, the displacement of the center 16 from the apex of the conical bore accommodating the full diameter of the rod 41 when the latter is swung into an extreme position. The relative motion of the mount and of the sleeve about two perpendicular axes is readily accommodated by the flexible envelope without any leakage, yet the envelope, being anchored to the mount and to the sleeve, resists relative rotation thereof about the third perpendicular axis.

Leakage between the rod 41 and the sleeve 21 is precluded by a packing generally designated 43, which is contained within an enlarged interior bore 44 in the sleeve. Encompassing the shaft 41 within the bore is a deformable packing washer 46, which is partly positioned and supported by a cone 47 formed within the bore 44 coaxially with the shaft 41, and extending in an outward direction from the vacuum chamber 6. A similar packing washer 48, having a similar extent, likewise encircles the rod 41 within the bore 44. A comparably contoured metallic spacer 49 is disposed between the washers 46 and 48 and is freely slidable within the cylindrical bore. The spacer serves to maintain the washers in appropriate position, and likewise assists in defining an interior chamber 51 connected to a vacuum pump, not shown, through a drilled passageway 52 in the spacer 49 and through a pump-out tube 53 joined to the sleeve 21. A packing nut 56 surrounds the rod 41 and by means of a threaded connection 57 engages the interior of the sleeve 21, so that when the packing nut 56 is rotated with respect to the sleeve, the washers 47 and 48 are suitably compressed into air-tight engagement with the rod.

With the arrangement, should any leakage along the rod 41 from the surrounding atmosphere toward the vacuum chamber 6 tend to develop, the orientation and flexibility of the washers 46 and 48 are such that they are even more firmly pressed against the rod 41, thereby precluding any such leakage. At the same time, the frictional engagement between the washers and the rod is not excessive, so that the rod is still freely manipulable in an axial direction along its length and in rotation about its own axis. The frictional resistance of the spherical surfaces 13 and 24 is also insignificant, and is reduced even more in the event lubricant is utilized on the rod 41, since withdrawing movement of the rod from the vacuum chamber causes the leading edge of the spherical surface 24 to strip off the outer lubricant layer at the location where the surfaces 13 and 24 meet, thereby affording excellent lubrication of those sliding surfaces.

The mechanism disclosed herein has been found to be very effective in permitting not only the usual translatory and rotary manipulation of a mechanism within a vacuum chamber from a control outside of such chamber, but is also especially useful in affording a relatively wide angle of swinging movement, all without undue leakage.

What is claimed is:

In a universal joint, a hollow mount terminating in a substantially spherically concave surface extending for less than a hemisphere, a sleeve terminating in a substantially spherically convex surface, means including a resilient metallic bellows hermetically sealed to said hollow mount and to said sleeve and enveloping said surfaces for resiliently urging said surfaces into mating and bearing relation, a rod mounted for sliding and rotary movements within said sleeve and passing through said hollow mount, and means including an opening formed in a wall of said hollow mount and communicating between the interior of said hollow mount and the interior of said metallic bellows for affording ready passage of gases therebetween.

ALLAN M. STARR.

REFERENCES CITED

The following references are of record in the file of this patent:

UNITED STATES PATENTS

| Number | Name | Date |
|---|---|---|
| 283,711 | Hunt | Aug. 21, 1883 |
| 1,529,874 | Culbertson | Mar. 17, 1925 |
| 1,821,274 | Plummer | Sept. 1, 1931 |
| 1,821,895 | Owens | Sept. 1, 1931 |
| 2,064,703 | Van De Graaff | Dec. 15, 1936 |
| 2,196,676 | Johnson et al. | Apr. 9, 1940 |
| 2,217,537 | Carlstedt | Oct. 8, 1940 |

FOREIGN PATENTS

| Number | Country | Date |
|---|---|---|
| 38,049 | Germany | 1886 |
| 321,019 | Great Britain | 1929 |